(12) United States Patent
Boday et al.

(10) Patent No.: US 9,040,682 B2
(45) Date of Patent: May 26, 2015

(54) FLAME RETARDANT CELLULOSE

(71) Applicant: International Business Machines Corporation, Armonk, NY (US)

(72) Inventors: Dylan J. Boday, Tucson, AZ (US); Joseph Kuczynski, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 13/734,199

(22) Filed: Jan. 4, 2013

(65) Prior Publication Data

US 2014/0194617 A1 Jul. 10, 2014

(51) Int. Cl.
- *C09K 21/14* (2006.01)
- *C08G 83/00* (2006.01)
- *C08F 8/00* (2006.01)

(52) U.S. Cl.
CPC ............... *C09K 21/14* (2013.01); *C08G 83/00* (2013.01)

(58) Field of Classification Search
CPC .................................. C09K 21/14; C08F 8/00
USPC ...................... 536/62, 94, 124, 109
See application file for complete search history.

(56) References Cited

U.S. PATENT DOCUMENTS

| | | | |
|---|---|---|---|
| 3,321,330 A | 5/1967 | Mohney | |
| 6,992,151 B2 | 1/2006 | Wang et al. | |
| 2009/0025144 A1* | 1/2009 | Tanaka et al. | 5/483 |

FOREIGN PATENT DOCUMENTS

| | | | |
|---|---|---|---|
| CN | 102190814 A | | 9/2011 |
| CN | 102549056 A | | 7/2012 |
| CN | 102561036 A | | 7/2012 |
| CN | 102757580 A | * | 10/2012 |
| EP | 1112314 B1 | | 4/2007 |
| JP | 3885263 B2 | | 2/2007 |
| WO | 2012116886 A1 | | 9/2012 |

OTHER PUBLICATIONS

U.S. Appl. No. 13/734,171, entitled "Flame Retardant Cellulose Acetate", filed Jan. 4, 2013.

* cited by examiner

*Primary Examiner* — Patrick Lewis
*Assistant Examiner* — Everett White
(74) *Attorney, Agent, or Firm* — Nicholas L. Cadmus

(57) ABSTRACT

Flame retardant cellulose is prepared comprising cellulose fibers and an organophosphate compound bonded to the cellulose fibers. Accordingly, the bonded phosphate-functional group provides the cellulose fibers with pendant phosphate ester functionality. Numerous phosphate derivatives can be envisaged that will accomplish the intended task.

10 Claims, No Drawings

FLAME RETARDANT CELLULOSE

BACKGROUND

The present invention relates in general to the field of flame retardants. More particularly, the present invention relates to flame retardant cellulose for use as a sound absorber with flame retardant properties.

Cellulose is an organic compound with the formula $(C_6H_{10}O_5)_n$, derived from D-glucose units, which condense through $\beta(1\to 4)$ glycosidic bonds. Cellulose is a straight chain polymer. The multiple hydroxyl groups on the glucose from one chain form hydrogen bonds with oxygen atoms on the same or on a neighbor chain, holding the chains firmly together side-by-side and forming microfibrils.

Many properties of cellulose depend on its chain length or degree of polymerization (e.g., the number of glucose units that make up one polymer molecule). Cellulose from wood pulp has typical chain lengths between 300 and 1700 units; cotton and other plant fibers, as well as, bacterial cellulose have chain lengths ranging from 800 to 10,000 units. Cellulose is an excellent sound absorber, sustainable, and is cost effective compared to polyurethane foam.

SUMMARY

Aspects of an embodiment of the present invention disclose a flame retardant cellulose. The flame retardant cellulose comprises cellulose fibers and an organophosphate compound bonded to the cellulose fibers. Accordingly, the bonded phosphate-functional group provides the cellulose fibers with pendant phosphate ester functionality. Numerous phosphate derivatives can be envisaged that will accomplish the intended task.

DETAILED DESCRIPTION

Cellulose is an excellent sound absorber. The advantages of cellulose are that it is cost effective compared to polyurethane foam and it is sustainable. Unfortunately, samples of cellulose insulation failed to meet the UL 94 HB flammability requirement. UL 94 is a plastics flammability standard released by Underwriters Laboratories of the USA. The standard classifies plastics according to how they burn in various orientations and thicknesses, from lowest (least flame-retardant) to highest (most flame-retardant). Consequently, there is a need for flame retardant cellulose. Although manufacturers intentionally add flame retardants, these are merely dispersed within the cellulose fibers. Consequently, the loading levels are inadequate to provide the level of ignition resistance required.

In brief summary, in accordance with one embodiment of the present invention, by binding a nonhalogenated, RoHS (Restriction of Hazardous Substances Directive) compliant flame retardant to individual cellulose fibers, flame retardant cellulose can be produced. The hydroxyl groups (—OH) of cellulose can be partially or fully reacted with various reagents to afford derivatives with useful properties. Phosphate esters are well known flame retardants for use in the plastics industry. An organophosphate compound reacted with cellulose may produce cellulose fibers with pendant phosphate ester functionality.

In accordance with one embodiment of the present invention, the flame retardant cellulose comprises cellulose fibers and an organophosphate compound covalently bonded to the cellulose fibers. The flame retardant cellulose may be prepared by reacting cellulose fibers and an organophosphate compound. The reaction may be carried out in any suitable solvent (with subsequent removal of hydrogen chloride (HCl) by rinsing with buffered water) or in the gas phase (i.e., by passing the vapor of an organophosphate compound such as diphenyl phosphoryl chloride over the cellulose fibers). The substituted cellulose fibers may then be fabricated into the desired geometry with the end result being a flame retardant article.

The cellulose fibers $(C_6H_{10}O_5)_n$, wherein n is an integer of at least 1, may be a commercially available cellulose fiber. There are two scales that are generally used to classify particle sizes, the US Sieve Series and Tyler Equivalent. For example, the mesh opening size of the Tyler Equivalent scale ranges from about 2.5 mesh to about 400 mesh. Powders and granular materials may be described as having a certain mesh size (e.g., 30 mesh sand). More precise specifications will indicate that a material will pass through some specific mesh (that is, have a maximum size; larger pieces won't fit through this mesh) but will be retained by some specific tighter mesh (that is, a minimum size; pieces smaller than this will have passed through the mesh). This type of description establishes a range of particle sizes. A conversion chart is used to determine approximate diameters of the particles. For example, if the particles are described as a 60 mesh particles the diameter of the particles would be about 0.251 mm. The cellulose fiber may have a particle size from about 2.5 mesh to about 400 mesh, more particularly 20 mesh to 140 mesh.

The organophosphate compound covalently bonded to the cellulose fibers may be one or more alkyl phosphates and/or one or more aryl phosphates; and combinations thereof. More particularly, the organophosphate compound may be one or more substituted or unsubstituted butyl phosphates and/or one or more substituted or unsubstituted phenyl phosphates; and combinations thereof. For example, the organophosphate compound may be a substituted phenyl phosphate of Formula (1):

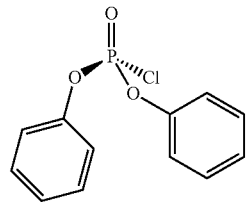

DIPHENYL PHOSPHORYL CHLORIDE

Diphenyl phosphoryl chloride may either be synthesized by reacting phenol ($C_6H_5OH$) and phosphorus(V) oxychloride ($POCl_3$), or purchased from a commercial source. The reaction to synthesize diphenyl phosphoryl chloride is illustrated generally in Scheme (1).

Scheme (1)

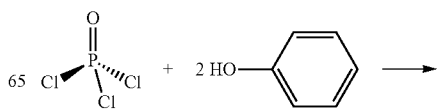

-continued

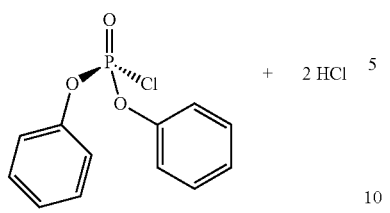

In another example, the organophosphate compound may be a substituted phenyl phosphate of Formula (2):

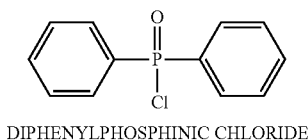

Formula (2)

DIPHENYLPHOSPHINIC CHLORIDE

Diphenylphosphinic chloride may be purchased from a commercial source.

It will be appreciated by those skilled in the art that, in accordance with one embodiment of the present invention, the intent is to covalently bind a phosphate-functional group to the cellulose fibers to provide the cellulose fibers with pendant phosphate ester functionality. As such, numerous phosphate derivatives can be envisaged that will accomplish the intended task.

Phosphate esters are well known flame retardants for use in the plastics industry. The pendant phosphate ester functionality provides the level of ignition resistance required. Phosphorus based flame retardants form a protective (char) layer which resists high temperatures and protects the underlying product from attack by oxygen and radiant heat. This minimizes the development of a full fire and increases escape time.

EXAMPLE

The following example is intended to illustrate the invention to those skilled in the art and should not be interpreted as limiting the scope of the invention set forth in the claims.

Flame Retardant Cellulose Preparation

The flame retardant cellulose may be prepared as follows. A known quantity of diphenyl phosphoryl chloride is reacted with cellulose fibers to form the substituted cellulose with pendant phosphate ester groups. The degree of substitution can be controlled by varying the quantity of diphenyl phosphoryl chloride in the reaction mixture. The mer unit for cellulose contains a single primary alcohol (highlighted by the box in Formula 3), therefore, depending on the level of substitution required to achieve the UL 94 HB specification (which is typically ≤10 wt % of the formulation), the diphenyl phosphoryl chloride concentration may be adjusted accordingly.

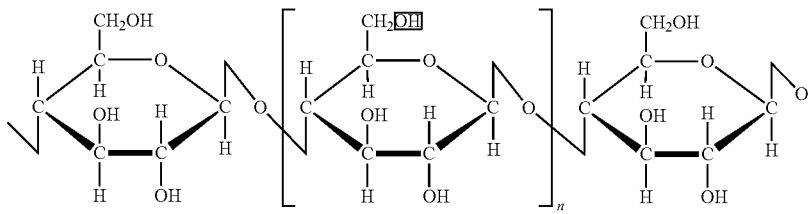

Formula (3)

For example, for a cellulose fiber with a chain length of 5000 units (n=5000 in Formula 3), there are 5000 reactive primary alcohol groups. If 10 wt % is the goal, there are 500 reactive primary hydroxyls which would require 500 equivalents of diphenyl phosphoryl chloride. For example, there is one equivalent of reactive primary hydroxyl groups per mer unit (182 g/mer) of cellulose. Therefore, for 18 g of cellulose, there are 0.1 equivalents of reactive hydroxyl groups. Reacting 10% of the primary hydroxyls requires 0.01 equivalents of diphenyl phosphoryl chloride, or 2.68 g. Again, depending on the level of phosphorylation required, these ratios can be easily altered.

First, tetrahydrofuran is added to an argon-flushed round bottomed flask equipped with a stir bar and an addition funnel. Cellulose fibers and pyridine are added to the flask and cooled to 0° C. in an ice bath. Diphenyl phosphoryl chloride is then added dropwise with stifling. Proportions of the reactants are such that the resulting diphenyl phosphoryl chloride starting concentration (i.e., after addition of diphenyl phosphoryl chloride is completed) is about 0.5M. Two equivalents of the cellulose fiber are provided per mole of diphenyl phosphoryl chloride, and 2 moles of pyridine are provided per mole of diphenyl phosphoryl chloride. Pyridine:HCl begins to precipitate as soon as the diphenyl phosphoryl chloride addition begins. After the diphenyl phosphoryl chloride addition is complete, the reaction mixture is allowed to warm to room temperature (25° C.) and stirred for about 24 hours. The ratio of pyridine to diphenyl phosphoryl chloride can vary, but a 2:1 ratio is suitable.

The pyridine:HCl is filtered from the mixture, leaving a clear, colorless liquid phase behind. The solvent is removed in a rotary evaporator and the excess pyridine is distilled off under vacuum. The isolated product is dissolved in acetonitrile, passed through an alumina column, desolvated and dried under vacuum at 65° C. The above reaction is illustrated generally in Scheme (2), wherein y and n are integers.

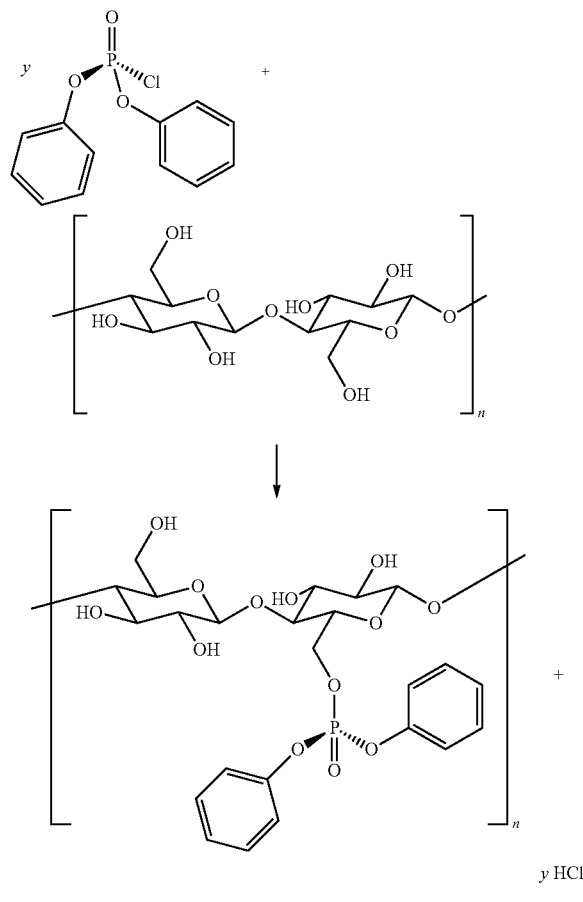

Scheme (2)

What is claimed is:

1. A flame retardant cellulose, comprising:
    cellulose fibers; and
    an organophosphate compound covalently bonded to the cellulose fibers.

2. The flame retardant cellulose of claim 1, wherein the organophosphate compound is selected from the group consisting of alkyl phosphates, aryl phosphates, and combinations thereof.

3. The flame retardant cellulose of claim 1, wherein the organophosphate compound is selected from the group consisting of substituted butyl phosphates, unsubstituted butyl phosphates, substituted phenyl phosphates, unsubstituted phenyl phosphates and combinations thereof.

4. The flame retardant cellulose of claim 1, wherein the organophosphate compound is diphenyl phosphoryl chloride.

5. The flame retardant cellulose of claim 1, wherein the organophosphate compound is diphenylphosphinic chloride.

6. A method of making a flame retardant cellulose, comprising the steps of:
    providing cellulose fibers; and
    reacting the cellulose fibers with an organophosphate compound to produce a flame retardant cellulose comprising an organophosphate compound covalently bonded to the cellulose fibers.

7. The method of claim 6, wherein the organophosphate compound is selected from the group consisting of alkyl phosphates, aryl phosphates, and combinations thereof.

8. The method of claim 6, wherein the organophosphate compound is selected from the group consisting of substituted butyl phosphates, unsubstituted butyl phosphates, substituted phenyl phosphates, unsubstituted phenyl phosphates and combinations thereof.

9. The method of claim 6, wherein the organophosphate compound is diphenyl phosphoryl chloride.

10. The method of claim 6, wherein the organophosphate compound is diphenylphosphinic chloride.

\* \* \* \* \*